US010607065B2

(12) United States Patent
Milman et al.

(10) Patent No.: US 10,607,065 B2
(45) Date of Patent: Mar. 31, 2020

(54) GENERATION OF PARAMETERIZED AVATARS

(71) Applicant: Adobe Inc., San Jose, CA (US)

(72) Inventors: Rebecca Ilene Milman, Menlo Park, CA (US); Jose Ignacio Echevarria Vallespi, San Jose, CA (US); Jingwan Lu, Santa Clara, CA (US); Elya Shechtman, Seattle, WA (US); Duygu Ceylan Aksit, San Jose, CA (US); David P. Simons, Seattle, WA (US)

(73) Assignee: Adobe Inc., San Jose, CA (US)

( * ) Notice: Subject to any disclaimer, the term of this patent is extended or adjusted under 35 U.S.C. 154(b) by 141 days.

(21) Appl. No.: 15/970,831

(22) Filed: May 3, 2018

(65) Prior Publication Data
US 2019/0340419 A1 Nov. 7, 2019

(51) Int. Cl.
G06K 9/00 (2006.01)
G06T 19/00 (2011.01)
G06T 13/40 (2011.01)
G06N 20/00 (2019.01)

(52) U.S. Cl.
CPC ......... *G06K 9/00268* (2013.01); *G06N 20/00* (2019.01); *G06T 13/40* (2013.01); *G06T 19/006* (2013.01)

(58) Field of Classification Search
CPC ....... G06T 13/40; G06T 19/006; G06N 20/00; G06K 9/00268
See application file for complete search history.

(56) References Cited

U.S. PATENT DOCUMENTS 5,995,119 A * 11/1999 Cosatto .................. G06T 13/40
345/473
6,532,011 B1 * 3/2003 Francini ............. G06K 9/00268
345/420

(Continued)

OTHER PUBLICATIONS

Lior Wolf, Unsupervised Creation of Parameterized Avatars, 2017 IEEE International Conference on Computer Vision, p. 1539-1547. (Year: 2017).*

(Continued)

*Primary Examiner* — Brenda C Bernardi
(74) *Attorney, Agent, or Firm* — SBMC

(57) ABSTRACT

Generation of parameterized avatars is described. An avatar generation system uses a trained machine-learning model to generate a parameterized avatar, from which digital visual content (e.g., images, videos, augmented and/or virtual reality (AR/VR) content) can be generated. The machine-learning model is trained to identify cartoon features of a particular style—from a library of these cartoon features—that correspond to features of a person depicted in a digital photograph. The parameterized avatar is data (e.g., a feature vector) that indicates the cartoon features identified from the library by the trained machine-learning model for the depicted person. This parameterization enables the avatar to be animated. The parameterization also enables the avatar generation system to generate avatars in non-photorealistic (relatively cartoony) styles such that, despite the style, the avatars preserve identities and expressions of persons depicted in input digital photographs.

20 Claims, 8 Drawing Sheets

(56) References Cited

U.S. PATENT DOCUMENTS

| | | | | |
|---|---|---|---|---|
| 6,993,163 | B2* | 1/2006 | Liu | G06K 9/00201 |
| | | | | 345/419 |
| 8,437,514 | B2* | 5/2013 | Wen | G06T 11/00 |
| | | | | 382/118 |
| 8,830,244 | B2* | 9/2014 | Kanemaru | G06T 13/40 |
| | | | | 345/473 |
| 8,831,379 | B2* | 9/2014 | Wen | G06K 9/00228 |
| | | | | 345/629 |
| 2009/0252435 | A1* | 10/2009 | Wen | G06K 9/00228 |
| | | | | 382/284 |
| 2011/0148868 | A1* | 6/2011 | Chang | G06T 15/04 |
| | | | | 345/419 |
| 2015/0035825 | A1* | 2/2015 | Zhou | G06T 13/40 |
| | | | | 345/419 |
| 2016/0284017 | A1* | 9/2016 | Almog | G06Q 30/0643 |
| 2017/0213378 | A1* | 7/2017 | Mandel | G06T 13/80 |
| 2018/0068482 | A1* | 3/2018 | Yam | G06T 13/40 |
| 2018/0091732 | A1* | 3/2018 | Wilson | G06F 3/048 |
| 2018/0268595 | A1* | 9/2018 | Sarna | G06T 13/80 |
| 2018/0300927 | A1* | 10/2018 | Hushchyn | G06T 13/40 |
| 2019/0266807 | A1* | 8/2019 | Lee | G06T 13/40 |

OTHER PUBLICATIONS

"K-Fold Cross Validation", Retrieved at: https://en.wikipedia.org/wiki/Cross-validation%5C_(statistics)#k-fold%5C_cross-validation—on Aug. 7, 2018, 1 page.

"Moving / Average—Wikipedia", Retrieved at: https://en.wikipedia.org/wiki/Moving%5C_average—on Aug. 7, 2018, 1 page.

Aceto, "Cloud monitoring: A survey", Jun. 19, 2013, 23 pages.

Avizienis, "Dependability and Its Threats: A Taxonomy", Jan. 2004, 31 pages.

Baddar, "Anomaly Detection in Computer Networks: A State-of-the-Art Review", Dec. 2014, pp. 29-64.

Barford, "A Signal Analysis of Network Traffic Anomalies", In: The Second ACM SIGCOMM Workshop (2002), Nov. 2002, 12 pages.

Caron, "Auto-Scaling, Load Balancing and Monitoring in Commercial and Open-Source Clouds", Feb. 10, 2012, 28 pages.

Chandola, "Anomaly Detection : A Survey", Jul. 1, 2009, 72 pages.

Cheng, "Detection and Characterization of Anomalies in Multivariate Time Series", In: Proc. SIAM (2009), Apr. 2009, pp. 413-424.

Cohen, "Correlating instrumentation data to system states: A building block for automated diagnosis and control", Oct. 19, 2004, 15 pages.

Dullmann, "Performance Anomaly Detection in Microservice Architectures Under Continuous Change", Jan. 3, 2017, 89 pages.

Dunning, "Practical Machine Learning: A New Look At Anomaly Detection", Jun. 2014, 66 pages.

Fu, "Execution Anomaly Detection in Distributed Systems through Unstructured Log Analysis", In: Proceedings of IEEE International Conference on Data Mining, Dec. 2009, 10 pages.

Goldstein, "A Comparative Evaluation of Unsupervised Anomaly Detection Algorithms for Multivariate Data", Apr. 19, 2016, 31 pages.

Gu, "Online Anomaly Prediction for Robust Cluster Systems", In: Proc.—International Conference on Data Engineering (2009), Mar. 29, 2009, 12 pages.

Gupta, "Context-Aware Time Series Anomaly Detection for Complex Systems", In: Proc. of the SDM Workshop on Data Mining for Service and Maintenance (2013), Jan. 1, 2013, pp. 14-22.

Hole, "Anomaly Detection with HTM—Chapter 12", In: Anti-fragile ICT Systems. Springer International Publishing, 2016., Jan. 2016, pp. 125-132.

Ibidunmoye, "Performance Anomaly Detection and Bottleneck Identification", Jul. 3, 2015, 37 pages.

Leitner, "Application-Level Performance Monitoring of Cloud Services Based on the Complex Event Processing Paradigm", In: 2012 Fifth IEEE International Conference on Service-Oriented Computing and Applications (SOCA) (2012), Dec. 2012, 8 pages.

Liu, "Isolation Forest", ICDM'08. Eighth IEEE International Conference on. IEEE. 2008, Dec. 2008, 10 pages.

Mazel, "A Taxonomy of Anomalies in Backbone Network Traffic", 10th International Wireless Communications and Mobile Computing Conference (2014),, Aug. 2014, pp. 30-36.

Mirkovic, "A Taxonomy of DDoS Attack and DDoS Defense Mechanisms", In: SIGCOMM Comput. Commun. Rev. 34.2 (2004), Apr. 2004, pp. 39-54.

Niggemann, "Learning Behavior Models for Hybrid Timed Systems", Jul. 2012, 9 pages.

Pedregosa, "Scikit-learn: Machine Learning in Python", In: Journal of Machine Learning Research 12 (2011), Oct. 2011, 7 pages.

Pertet, "Causes of Failure in Web Applications", In: Parallel Data Laboratory, Dec. 2005, 19 pages.

Plonka,"Network Anomaly Confirmation, Diagnosis and Remediation", In: 2009 47th Annual Allerton Conference on Communication, Control, and Computing, Sep. 30, 2009, 8 pages.

Sharma, "Fault Detection and Localization in Distributed Systems using Invariant Relationships", In: IEEE/IFIP Int. Conf. on Dependable Systems and Networks 1 (2013), Aug. 2013, 8 pages.

Sheth, "MOJO: A Distributed Physical Layer Anomaly Detection System for 802.11 WLANs", In: Proc. of the 4th int. conf. on Mobile systems, applications and services (2006), Jun. 22, 2006, pp. 191-204.

Tan, "Prepare: Predictive Performance Anomaly Prevention for Virtualized Cloud Systems", In: Distributed Computing Systems (ICDCS), Jun. 2012, 10 pages.

Thottan, "Proactive Anomaly Detection Using Distributed Intelligent Agents", In: Network, IEEE Oct. (1998), Oct. 1998, pp. 21-27.

Wang, "Fault Detection for Cloud Computing Systems with Correlation Analysis", 2015 IFIP/IEEE International Symposium on Integrated Network Management (IM), Jul. 2015, 7 pages.

\* cited by examiner

GENERATION OF PARAMETERIZED AVATARS

BACKGROUND

Advances in computing technologies enable a variety of computing systems to leverage digital visual representations of users. By way of example, these visual representations are used as user profile pictures, as user likenesses in digital communications (e.g., SMS text messages, instant messages) or animated as virtual guides through virtual environments, as backgrounds displayed based on a current device mode (e.g., home page, sleep screen), and so on. Many of these computing systems include functionality that supports user interaction to generate an "avatar," a virtual representation of a user. Alternately or in addition, these computing systems include functionality that supports using digital visual content (e.g., an image) depicting an avatar.

Many conventional avatar generation systems present different, cartoon versions of body-part features (e.g., a face shape, hair, eyes, nose, mouth, wrinkles, general build, height, and so on), which are user selectable to build an avatar. A drawback of these systems, though, is that the selection process—to select a corresponding version of each selectable feature—can be tedious for client device users. Moreover, users may not accurately select the cartoon versions of the features that best preserve their identity or expression. Other conventional avatar generation systems leverage machine-learning models that convert a photorealistic image of person into an image depicting a cartoonized avatar. However, these conventionally-configured systems also have drawbacks. For example, such systems are limited to producing images of avatars in cartoon styles which the systems depend on being more photorealistic to produce higher quality avatar images. With less photorealistic cartoon styles, these conventionally-configured systems fail to reliably preserve identities and expressions of depicted persons and also suffer from quality issues, e.g. they produce grainy images of the cartoonized avatars. Due to these drawbacks, client device users often opt for other forms of representation in digital content, such as digital photographs, digital images depicting something other than a likeness of a user (e.g., landscape, artwork, graphics), and so on.

SUMMARY

To overcome these problems, generation of parameterized avatars is leveraged. An avatar generation system uses a trained machine-learning model to generate a parameterized avatar, from which digital visual content (e.g., images, videos, augmented and/or virtual reality (AR/VR) content) can be generated. The machine-learning model is trained to identify avatar features of a particular style—from a library of these styled (e.g., cartoon) avatar features—that correspond to features of a person depicted in a digital photograph. The parameterized avatar is produced as parameterized data (e.g., a feature vector) that indicates the cartoon features identified from the library by the trained machine-learning model for the depicted person. This parameterization enables the avatar to be animated and to be edited by a client device user, if desired. The parameterization also enables the avatar generation system to generate avatars in non-photorealistic (relatively cartoony) styles such that, despite the style, the avatars preserve identities of persons depicted in input digital photographs.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
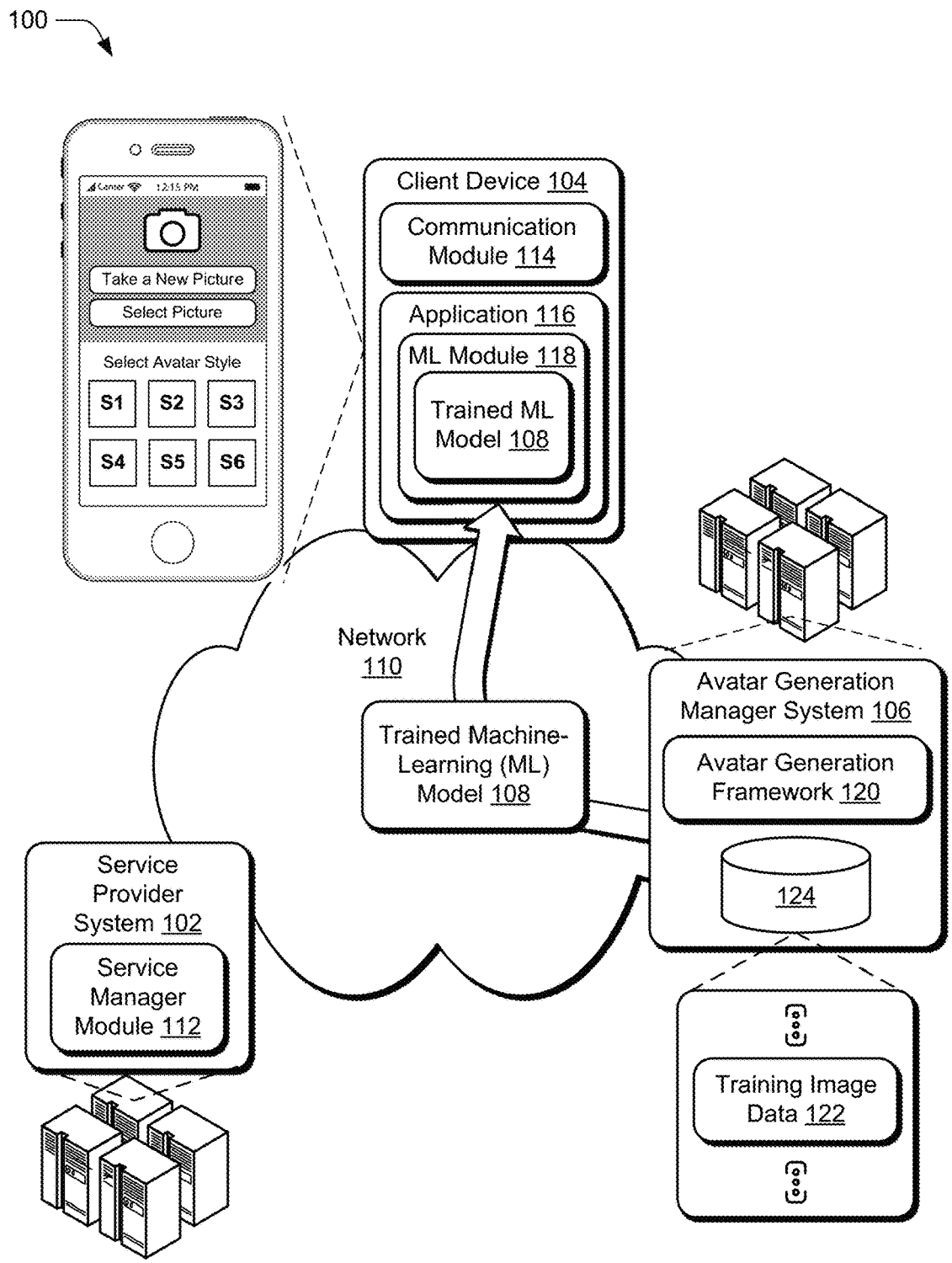
FIG. 1 is an illustration of an environment in an example implementation that is operable to employ techniques described herein.

Advances in computing technologies enable a variety of computing systems to leverage digital visual representations of users. In some examples, these computing systems include functionality that supports user interaction to generate an "avatar," a virtual representation of a user. Many conventional avatar generation systems present different, cartoon versions of body-part features, which are selectable to build an avatar. A drawback of these systems, though, is that the selection process—to select a corresponding version of each selectable feature—can be tedious for client device users. Other conventional avatar generation systems leverage machine-learning models. However, these conventionally-configured systems also have drawbacks. For example, such systems are limited to producing images of avatars in cartoon styles which the systems depend on being more photorealistic to produce higher quality avatar images. Due to these drawbacks, client device users often opt for other forms of representation in digital content, such as digital photographs, digital images depicting something other than a likeness of a user (e.g., landscape, artwork, graphics), and so on.

To overcome these problems, generation of parameterized avatars is leveraged. In one or more implementations, an avatar generation system allows a client device user to select digital photographic content (e.g., an image or video) of a person to serve as a basis for generating an avatar of the person. In contrast to conventional system which simply output an image depicting an avatar, the avatar generation system generates a parameterized avatar. This parameterized avatar is produced as parameterized data (e.g., a feature vector) indicative of styled cartoon features, from a library of styled cartoon features (e.g., a library including multiple cartoon noses, eyes, face shapes, hair styles, and so forth), identified as corresponding to the person's features depicted in the digital photographic content.

To identify the cartoon features that correspond to a person's features, the avatar generation system uses a trained machine-learning model. This machine-learning model may be configured as a neural network trained to receive a digital photograph, including at least a person's face, as input and to provide the parameterized avatar as output. In one or more implementations, the avatar generation system is formed based on a framework that initially provides the digital photograph to a facial identity network, which generates a condensed parameter vector indicative of features of the depicted person's face. In such implementations, the avatar generation system then provides this facial feature vector as the input to the trained machine-learning model.

Broadly speaking, the trained machine-learning model is trained using a framework that includes a parameter network and a generative adversarial network (GAN). The trained machine-learning model corresponds to the parameter-network portion, once trained. Initially, the framework is trained using supervised training of the parameter network. This involves exposing the parameter network to digital photographs of persons that are paired with parameters of matching digital cartoon images. After this initial supervised training, the training of the machine-learning model involves unsupervised training in which a second network (e.g., the GAN) is used to refine the parameter network, in part, to accurately identify which cartoon features in a library of cartoon features correspond to features of persons depicted in digital photographs. In one or more implementations, the initial supervised training is performed with a relatively small set of training data in relation to the subsequent unsupervised training. As noted just above, this relatively small set of training data includes pairs of digital photographs of persons and parameters of matching digital cartoon images, where the parameters are manually created parameterizations of the matching cartoon images to train the parameter network under "supervision." Under this supervised and then unsupervised approach, results of the GAN "refine" the network after the initial training.

In one or more implementations, the avatar generation system includes or has access to multiple trained machine-learning models, each trained to produce avatars having a respective style, which is different one model from another. Given this, the avatar generation system enables users to select a particular avatar style and generates a parameterized avatar in the selected style. If the user chooses a different avatar style, the avatar generation system generates the parameterized avatar in the different style.

In contrast to avatars generated by conventional avatar generation techniques, the parameterized avatars generated by the avatar generation system describe which known cartoon features correspond to a depicted face, such that the described features can be assembled into a model configured for rendering in a digital image and/or animation. By identifying corresponding cartoon features using machine learning, the described systems preserve an identity and expression of a person depicted by a digital photograph better than conventional systems. This also enables the avatar generation system to generate parameterized avatars that accurately convey identities in styles that are less photorealistic than conventional techniques, e.g., relatively non-photorealistic or relatively cartoon styles. Due also to the output as parameterized data, the described systems are capable of generating higher quality digital visual content (e.g., images and animations) than some conventional techniques. Consequently, avatars generated using the described systems may be used more than avatars generated using conventional techniques, such as for user profile photos, as characters in video games, as guides through virtual environments, for visually supplementing communications (e.g., text messages), and so forth.

Term Descriptions

As used herein, the term "digital photograph" refers to a digital image depicting photorealistic content captured with one or more imaging sensors, e.g., of a digital camera. Example file types of digital photographs include .jpeg, .png, .tiff, high dynamic range (HDR) image files, raw image files, and so forth. A digital photograph may be extracted from digital video content in one or more implementations. Indeed, the digital photograph may comprise a frame or a portion of a frame of the digital video content.

As used herein, the term "avatar" refers to a cartoonized representation of a person. Avatars may comprise a representation of just a person's head (and facial features) or a representation of the person's entire body. In other words, the described techniques may generate parameterized data indicative of an avatar head or parameterized data indicative of an entire avatar body without departing from the spirit or scope of the described techniques.

As used herein, the term "parameterized avatar" refers to the parameterized data produced in accordance with the described techniques to describe styled cartoon features that are identified (e.g., from a library of features) to represent features of a person depicted in a digital image. One example of this parameterized data, which may be used to implement a parameterized avatar, is a feature vector.

As used herein, the term "cartoon" refers to a non-photorealistic style of visual representation of objects—animation as contrasted with photorealistic content. Cartoon styles for avatars can range between near photorealistic styles and styles that are less photorealistic (e.g., more "cartoony") without departing from the spirit or scope of the described techniques.

As used herein, the term "identity" refers to a person's likeness as depicted in a digital photograph. An avatar that preserves a person's identity accurately conveys the person's likeness whereas an avatar that does not preserve the person's identity does not accurately convey the person's likeness. The term "expression" refers to a manner in which features of a person's face are disposed as depicted in a digital photograph. An avatar that preserves a person's expression accurately conveys the disposition of features whereas an avatar that does not preserve the person's expression does not accurately convey the disposition of features.

In the following discussion, an example environment that may employ the techniques herein is first described. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ generation of parameterized avatars described herein. The illustrated environment 100 includes a service provider system 102, client device 104, and avatar generation manager system 106 to provide trained machine-learning model 108. The service provider system 102, client device 104, and avatar generation manager system 106 are communicatively coupled, one to another, via a network 110.

Computing devices that are usable to implement the service provider system 102, client device 104, and avatar generation manager system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 8.

The service provider system 102 is illustrated as including a service manager module 112 that is representative of functionality to provide services accessible via the network 110. These services are usable to make products or services available to consumers. The service manager module 112, for instance, may expose a website, social network platform (e.g., a multiplayer gaming platform), or other functionality that is accessible via the network 110 by a communication module 114 of the client device 104. The communication module 114 may be configured in a variety of ways to obtain data from the service provider system 102 via the network 110. This data is employed by the communication module 114 to enable a user of the client device 104 to communicate with the service provider system 102 to obtain information corresponding to the products or services, e.g., gamer interaction data when the service provider system 102 is a multiplayer gaming platform.

The client device 104 also includes application 116, which leverages the functionality of the communication module 114 to communicate with the service provider system 102. Although the communication module 114 is illustrated as being separate from the application 116, the application 116 may include or otherwise have access to the functionality of the communication module 114. The application 116 may be configured in a variety of ways, e.g., it may be configured as a browser-based application, a network-enabled application, a native operating system component, and so on that is capable of leveraging the data obtained from the service provider system 102. Additionally, the application 116 enables users to interact with the client device 104 to generate parameterized avatars in connection with respective functionality of the application 116. Some examples of functionality that a suitably configured application can provide for a user of the client device 104 include social networking, gaming, multiplayer gaming, online shopping, content creation and/or editing, communication enhancing (e.g., an application for use in connection with composing text messages, instant messages, emails, etc.), and so forth. To generate parameterized avatars, the application 116 includes machine learning module 118, which includes at least one trained machine-learning model 108— trained to generate parameterized avatars having a particular avatar style.

In order to provide trained machine-learning models to client devices for generation of these avatars, the service provider system 102 may employ the avatar generation manager system 106. Although functionality of the avatar generation manager system 106 is illustrated as separate from the service provider system 102, this functionality may also be incorporated as part of the service provider system 102, further divided among other entities, and so forth. The avatar generation manager system 106 includes avatar generation framework 120 that is implemented at least partially in hardware of a computing device to provide trained machine-learning models to the client device 104. These trained machine-learning models are trained using training image data 122, which is illustrated as stored in storage 124.

The training image data 122 represents sets of digital images that the avatar generation framework 120 uses to generate and train machine-learning models, e.g., so that the trained machine-learning models generate from digital photographs parameterized avatars that preserve identities and expressions of respective persons captured in the digital photographs. Sets of the training data 122 that can used to train a machine-learning model to produce avatars of a particular style include at least two subsets of the training data—a first subset for the initial, supervised training of a parameter network and a second subset for the subsequent, unsupervised training. As introduced above, this first subset of the training image data 122 includes digital photographs of persons. The digital photographs of this first subset are further paired with parameters (e.g., manually created parameterizations) of digital cartoon images that match the digital photographs. Additionally, this subset of the training data 122 is relatively small (e.g., about 700 pairs) in relation to the second subset of the training data 122 used for the subsequent, unsupervised training of the machine-learning models. In contrast to the supervised training subset, the unsupervised training data 122 includes unpaired photorealistic digital images (digital photographs) of persons and cartoon digital images of persons.

Broadly speaking, the described systems can leverage trained machine-learning models in different ways to generate parameterized avatars of different styles. In one or more implementations, for a set of the training image data 122 each of the cartoon digital images (e.g., in both the first and second subsets) has a same or similar style. In this way, the avatar generation framework 120 generates a trained machine-learning model 108 for a particular style. In such implementations, to train a machine-learning model to generate parameterized avatars of a different style, the avatar generation framework 120 uses a different set of training image data 122, e.g., a set including cartoon digital images of the different style. In addition or alternately, a new cartoon style can be generated by redrawing each feature (e.g., each face shape, each nose, each set of eyes, each hairstyle, etc.) of a previous cartoon style. Rather than retrain a machine-learning model in the new cartoon style, however, a parameterized avatar is generated by a machine-learning model trained based on the previous cartoon style. This parameterized avatar is then leveraged to identify the features in the new cartoon style that are mapped to the features of the previous cartoon style—because there is a one to one mapping between the features of the new cartoon style and the previous cartoon style. Due to this, the parameterized avatar generated can simply be rendered according to the new cartoon style.

The avatar generation framework 120 leverages machine learning techniques to determine cartoon styles from the training image data 122 and correspondences of avatar cartoon features (e.g., noses, eyes, mouths, face shapes, hair, and so on) with the respective features of persons in the photorealistic digital images. The avatar generation framework 120 further leverages machine learning techniques to produce the trained machine-learning models in connection with these determinations. The avatar generation framework 120 can use any type of machine learning techniques capable of learning the cartoon styles and feature correspondences given sets of training image data that include photorealistic and cartoon digital images of various persons. According to various implementations, such a machine-learning model uses supervised learning, unsupervised learning, and/or reinforcement learning. For example, the machine-learning model can include, but is not limited to, auto encoders, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. The avatar generation framework 120 may use machine learning techniques to continually train and update the machine-learning model (or, in other words, to update a trained machine-learning model) to more accurately preserve identities and expressions in parameterized avatars based on avatars generated using the trained machine-learning models and feedback from users, e.g., to further adjust features (e.g., noses, eyes, mouths, face shapes, hair, and so on) of the generated avatars.

In the context of the described environment 100, the client device 104 is depicted displaying a user interface that allows a user of the client device 104 to select a digital image (e.g., from storage accessible to the client device 104) or capture a new digital image. As described in more detail below, the selected (or newly captured) digital image serves as input to the trained machine-learning model 108, which outputs a parameterized avatar. This parameterized avatar is styled according to a cartoon style with which the trained machine-learning model 108 is trained or according to a cartoon style that maps (on feature-to-feature basis) to the cartoon style with which the trained machine-learning model 108 is trained. In one or more implementations, the machine learning module 118 may include multiple different trained machine-learning models, each trained to generate parameterized avatars in a respective style. To this extent, the client device 104 is also pictured displaying a portion of a user interface that allows a user of the client device 104 to select one of multiple different avatar styles. Based on a style selection, the machine learning module 118 provides a selected image to the respective trained machine-learning model that is configured to generate parameterized avatars of the selected style or the respective trained machine-learning model that is configured to generate parameterized avatars that map to the selected style.

Having considered an example environment, consider now a discussion of some example details of the techniques for generation of parameterized avatars in a digital medium environment in accordance with one or more implementations.

Generation of Parameterized Avatars

Figure 2:
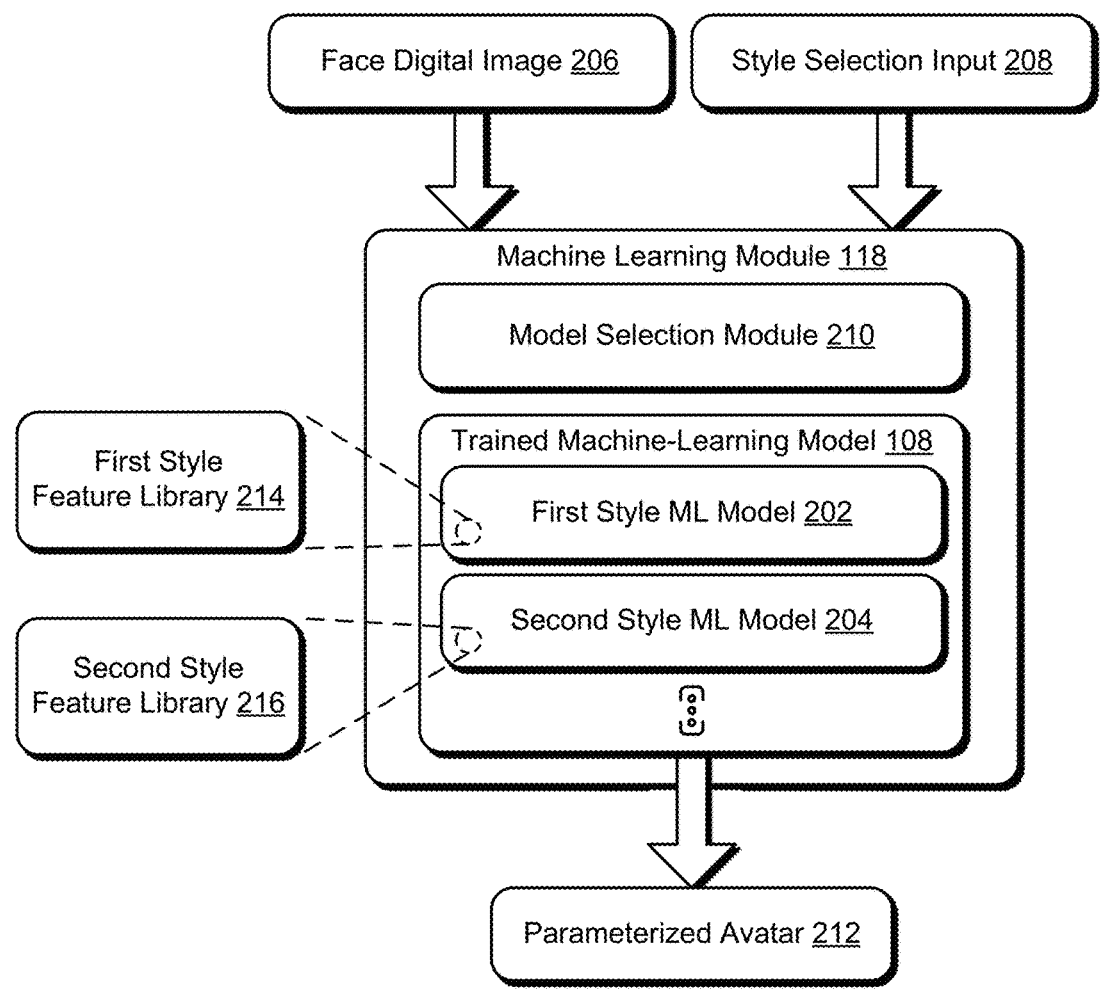
FIG. 2 depicts an example implementation in which a trained machine-learning model of FIG. 1 generates a parameterized avatar based on a digital photograph of a person and according to a selected avatar style.

FIG. 2 depicts an example implementation 200 in which a trained machine-learning model of FIG. 1 generates a parameterized avatar based on a digital photograph of a person and according to a selected avatar style.

The illustrated example 100 includes from FIG. 1 the machine learning module 118 with the trained machine-learning model 108. In this example 200, the trained machine-learning model 108 is depicted having first style machine-learning model 202 and second style machine-learning model 204. The trained machine-learning model 108 is also depicted with ellipses, which indicates that there may be machine-learning models for more than two styles. Though illustrated with these two models, it should be appreciated that in some implementations there may be just one machine-learning model for one style of parameterized avatar, e.g., the machine learning module 118 may include the trained machine-learning model 108 trained for one particular style and not other machine-learning models. In one or more implementations, the first and second style machine-learning models 202, 204 (and any other style machine-learning models) may not be included in the trained machine-learning model 108. Instead, the first and second style machine-learning models 202, 204 (and any other style machine-learning models) may be separate components of the machine learning module 118. In any case, inclusion of the first style machine-learning model 202 and the second style machine-learning model 204 represent a scenario in which the trained machine-learning model 108 is capable of generating a parameterized avatar with a first style or a second, different style—depending on an avatar style selected by a client device user. Although the following example is discussed in relation to a scenario involving multiple machine-learning models, capable of generating parameterized avatars having different styles, one model from another, it should be appreciated that implementations may involve a single trained machine-learning model (and no additional style created that maps to the style of this single model), e.g., so a style selection may not be received.

In the illustrated example 200, the machine learning module 118 is depicted receiving face digital image 206 and style selection input 208. Broadly speaking, the face digital image 206 represents a photorealistic digital image (a digital photograph) that depicts at least a person's face. The face digital image 206 may also depict other body parts. As noted above, the face digital image 206 may correspond to a digital image accessed from data storage. Alternately or in addition, the face digital image 206 may be captured, e.g., as part of generating a parameterized avatar. In addition or alternately, the face digital image 206 may be extracted from video content, such as a video clip maintained in storage accessible to the client device 104 or captured by the client device 104 as part of generating a parameterized avatar. In such scenarios, the face digital image 206 may correspond to one or more frames of this digital video content.

The style selection input 208 represents a user selection of an available avatar style, such as a user touch selection received via a touchscreen in relation to selection instrumentalities displayed via a user interface, a voice selection received via microphone, an input-device (e.g., stylus, gaming controller, mouse) selection received via a communicative coupling with the client device 104, and so forth. As noted above, each of the first and second style machine-learning models 202, 204 is configured to generate parameterized avatars in a respective style, e.g., a first style and a second style, respectively. In such scenarios, a user interface is presented having instrumentalities that allow a user to select one of the two styles, e.g., a first instrumentality for selecting the first style and a second instrumentality for selecting the second style. As noted below, these instrumentalities may be configured as selectable representations of the different styles.

In the illustrated example, the machine learning module 118 is illustrated with model selection module 210. The model selection module 210 represents functionality of the machine learning module 118 to select a style model, e.g., the first style machine-learning model 202 or the second style machine-learning model 204, based on the style selection input 208. In accordance with the techniques described herein, the trained machine-learning model 108 provides the face digital image 206 to the selected model, which generates parameterized avatar 212 based on a learned style and correspondences of human features in photorealistic training images to features in particularly-styled cartoon images.

In addition to one or more models for styling the parameterized avatar 212, the trained machine-learning model 108 also represents functionality to perform machine-learning based facial recognition, and to generate a condensed parameter vector indicative of the face depicted in the face digital image 206 based on the machine-learning based facial recognition. The functionality of the trained machine-learning model 108 to perform the machine-learning based facial recognition may be implemented, at least in part, using a facial identity network, the output of which is condensed to a facial feature vector. The trained machine-learning model 108 then passes the condensed parameter vector indicative of the face as input to the selected style machine-learning model. In one or more implementations, the face digital image 206 is also provided as input to the selected style machine-learning model.

As noted above and below, the selected style machine-learning models generate the parameterized avatar 212 of the person depicted in the face digital image 206. Broadly speaking, the parameterized avatar 212 describes digital cartoon features of the person depicted in the face digital image 206, such as which of a plurality of different cartoon noses (of the learned style) corresponds to the nose of the person depicted in the face digital image 206, which of a plurality of different cartoon eyes (of the learned style) correspond to the eyes of the person depicted in the face digital image 206, and so forth. The parameterized avatar 212 also describes positioning of the digital cartoon features relative to one another, such as a position of the cartoon nose on a cartoon face, a position of the cartoon eyes on the cartoon face and relative to the cartoon nose, and so forth.

In this context, consider the first style feature library 214 and the second style feature library 216. These style feature libraries each represent information indicative of a plurality of cartoon options for different features of a person and that are styled in a respective cartoon style. By way of example, the first style feature library 214 includes information indicative of a plurality of noses, a plurality of eyes, and so on, having the first style. Similarly, the second style feature library 216 includes information indicative of a plurality of noses, a plurality of eyes, and so on, having the second style. In the context of the first style, the first style machine-learning model 202 is trained to identify the features in the first style feature library 214 that correspond to the face digital image 206. The parameterized avatar 212 is thus a record indicative of the cartoon features identified from a feature library under consideration. In one or more implementations, the parameterized avatar 212 is a feature vector indicative of these identified features.

In contrast to conventional avatar generation techniques, which simply generate one or more digital images of an avatar from a photorealistic image, the parameterized avatar 212 describes which known cartoon features correspond to a depicted face such that the described features can be assembled (e.g., by the application 116, the machine learning module 118, etc.) into a model that can be rendered in a digital image and/or animated. By identifying corresponding cartoon features using machine learning, the described systems preserve an identity of a person depicted in the face digital image 206 better than conventional systems. Further, the described systems are able to generate parameterized avatars 212 that accurately convey identities in styles that are less photorealistic than conventional techniques, e.g., cartoon styles. Due also to the output as parameterized data, the described systems are capable of generating higher quality digital visual content (e.g., images and animations) using the parameterized avatar 212 than some conventional techniques. By "higher quality" it is meant that the digital visual content has at least one characteristic that is more visually pleasing than the digital visual content produced using some conventional avatar generation techniques, these characteristics may include higher resolution, less grainy visual content, more distinct features (e.g., clearer boundaries between a face and background, between whites of eyes and irises), and so forth.

Figure 3:
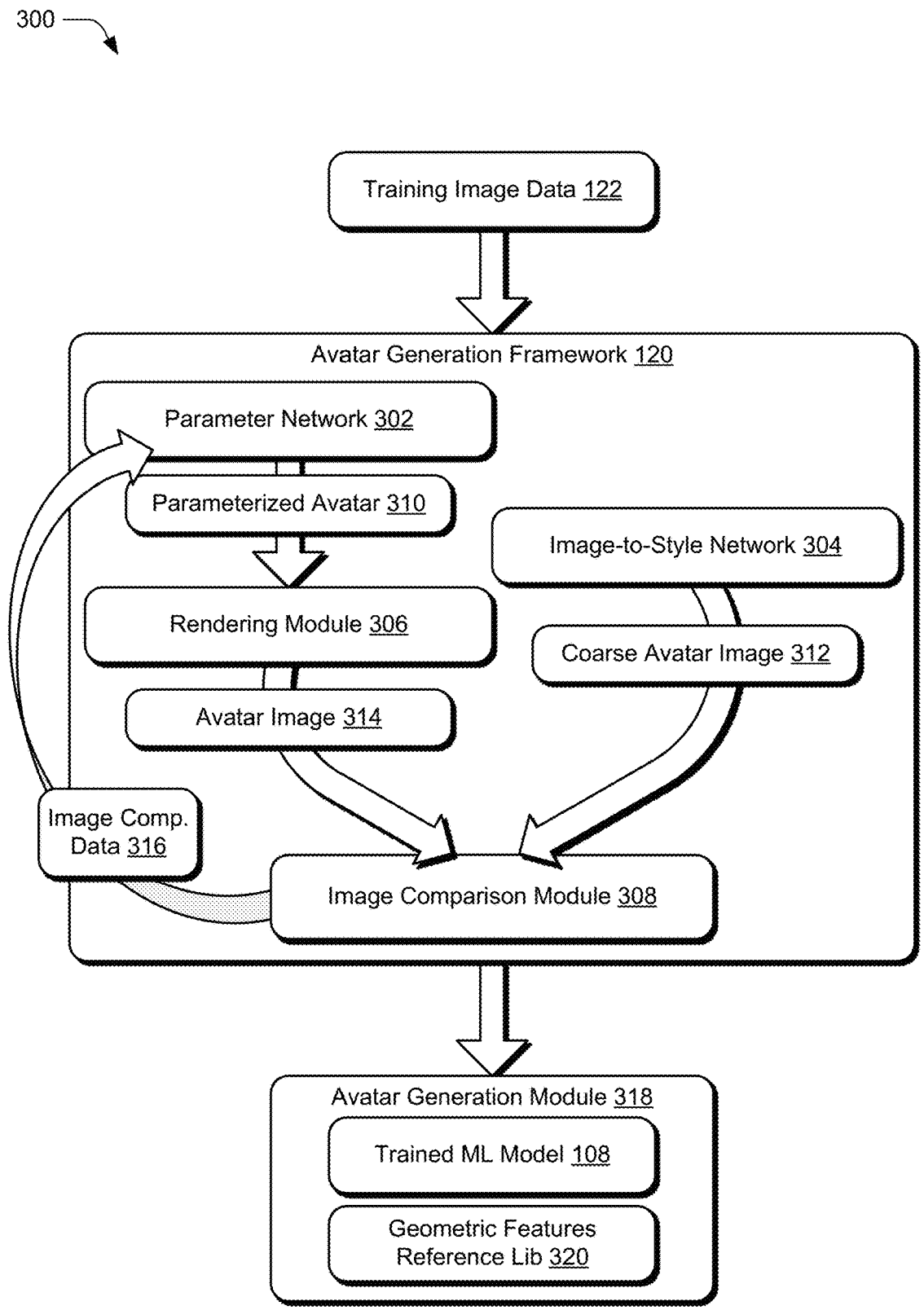
FIG. 3 depicts an example implementation in which an avatar generation framework of FIG. 1 is leveraged to generate and train a machine-learning model to generate parameterized avatars with a particular style and based on digital photographs of persons.

FIG. 3 depicts an example implementation 300 in which an avatar generation framework of FIG. 1 is leveraged to generate and train a machine-learning model to generate parameterized avatars with a particular style and based on digital photographs of persons. To this end, the trained machine-learning model 108 is implemented according to the avatar generation framework 120.

The illustrated example 300 includes from FIG. 1 the training image data 122, the avatar generation framework 120, and the trained machine-learning model 108. In this example 300, the avatar generation framework 120 is depicted having parameter network 302, image-to-style network 304, rendering module 306, and image comparison module 308. In implementations, the avatar generation framework 120 may be configured with different components to produce trained machine-learning models for generating parameterized avatars without departing from the spirit or scope of the described techniques. Indeed, the functionality discussed below may be carried out using different components in accordance with the described techniques.

In general, the avatar generation framework 120 represents functionality to use two networks—the parameter network 302 and the image-to-style network 304—to train a machine-learning model for use as the trained machine-learning model 108. Initially, the avatar generation framework 120 obtains the training image data 122. As noted above, the training image data 122 includes a first set of digital images having digital photographs of persons and corresponding digital images that depict cartoon versions of the respective persons. The training image data 122 also includes parameters that were used to create the cartoon versions of the respective persons depicted in the matching digital photographs. In addition to this first set of paired data, the training image data 122 includes a second, unpaired set of digital images, having digital photographs of persons and digital images of cartoon versions of persons. To train a machine-learning model to generate parameterized avatars of a particular style, the avatar generation framework 120 uses training image data 122 in which the cartoon versions of the persons are of the particular style.

In one or more implementations, the avatar generation framework 120 includes or has access to a facial identity network. The avatar generation framework 120 represents functionality to provide the digital photographs in the training image data 122 as input to the facial identity network and also to condense the output of the facial identity network into facial feature vectors indicative of a respective person's face, e.g., as depicted in a digital photograph. In other words, these facial feature vectors are "real person" feature vectors. The avatar generation framework 120 then provides these "real person" feature vectors as input to the parameter network 302, which outputs parameterized "cartoon" feature vectors. Parameterized avatar 310 represents the parameterized "cartoon" feature vectors output by the parameter network 302 during training.

Initially, the parameter network 302 is trained using supervised learning, which involves exposing the parameter network to the digital photographs of the paired set of the training data 122 and the manually-created parameters of the matching cartoon images. Once the avatar generation framework 120 carries out this initial supervised training, the avatar generation framework 120 furthers trains the parameter network 302 using unsupervised training which involves the unpaired set of the training data. This unsupervised portion of the training is effective to refine the parameter network 302. During the training process, the parameterized avatar 310 output by the parameter network 302 may not initially preserve the identity and/or expression of the person in the corresponding digital photograph. Through the described training process, however, the avatar generation framework 120 is configured to train the parameter network 302 to generate parameterized avatars in the particular style that better preserve an identity and expression of a person depicted in the corresponding digital photograph than they were preserved initially.

In general, the image-to-style network 304 represents a learned mapping between digital photographs and corresponding images of the particular style. In one or more implementations, the image-to-style network 304 is configured as a generative adversarial network (GAN) that, through pre-training, has learned a mapping between the digital photographs of the training image data 122 and the particularly styled corresponding cartoon images of the training image data 122. By way of example, CycleGAN is the image-to-style network 304. Once the mapping is learned, the avatar generation framework 120 provides the digital photographs of the training image data 122 to the image-to-style network 304, which for each digital photograph outputs a coarse avatar image 312. Although pixelated, the coarse avatar image 312 is effective to accurately convey geometric information about a person depicted in the corresponding digital photograph. The coarse avatar image 312 is a coarse prediction that is roughly indicative of how an image depicting an avatar of the person is visualized. The image comparison module 308 represents functionality to compare the output of the two networks, and thus to improve identity and expression perseveration of the parameter network 302 during training.

Due to the coarse avatar image 312 being a digital image, the image comparison module 308 needs a digital image indicative of the parameter network 302's output for comparison with the coarse avatar image 312. The rendering module 306 represents functionality to approximate a renderer and generate a digital image based on the parameterized avatar 310. In particular, the rendering module 306 generates avatar image 314 based on the parameterized avatar 310. Broadly speaking, the avatar image 314 is a digital image depicting an avatar styled in the particular style as indicated by the parameterized avatar 310.

The image comparison module 308 compares the coarse avatar image 312 and the avatar image 314. Based on the comparison, the image comparison module 308 generates image comparison data 316 indicative of the results of the comparison. The image comparison data 316 is used as feedback for the parameter network 302, which the avatar generation framework 120 uses to adjust weights associated with hidden layers or a latent model corresponding to the parameter network 302. By adjusting the parameter network 302 in this way, the parameterized avatar 310 output by the parameter network 302 at a subsequent iteration is refined. In other words, the parameterized avatar 310 output at the subsequent iteration is produced using the adjusted weights associated with the hidden layers or the adjusted latent model. In accordance with the described techniques, the image comparison module 308 compares the avatar image 314 and the coarse avatar image 312 for loss—differentiable loss. By way of example, the loss may relate to color difference between the coarse avatar image 312 and the avatar image 314, neural feature differences (e.g., perceptual loss) between these images, discrimination between the images (e.g., neural networks to determine whether the images are a pair or not), or other suitable measures of difference for digital visual media.

Once the avatar generation framework 120 has sufficiently trained the parameter network 302 using the image-to-style network 304, e.g., once the image comparison data 316 reaches a threshold indicating that the parameterized avatar 310 suitably preserves identity and expression, the parameter network 302 may be packaged for use as the trained machine-learning model 108. By way of example, the trained machine-learning model 108 may be packaged for use by client devices and/or for incorporation into applications, e.g., to generate parameterized avatars from input digital photographs. In the illustrated example 300, the trained machine-learning model 108 is depicted packaged in avatar generation module 318 with geometric features reference library 320. The avatar generation module 318 may correspond to one example of the machine learning module 118 from FIG. 1. Further, the avatar generation module 318 may be incorporated into an application or operating system.

In one or more implementations, the geometric features reference library 320 describes geometries underlying features of a given cartoon style. For instance, the geometric features reference library 320 describes geometries underlying each different nose that is available for the given cartoon style. The geometries described by the geometric features reference library 320 may further map to a corresponding feature in different style feature libraries. By way of example, the parameterized avatar 212 may include a parameter indicative of a particular nose of the first style feature library 214. In one or more implementations, this particular nose may be associated with a description of a particular underlying nose geometry included in or otherwise accessible to the geometric features reference library 320. Similarly, the second style feature library 216 may include a nose associated with a same description of this particular underlying nose geometry. Accordingly, these noses—of the first and second style feature libraries 214, 216—may correspond to a same nose, but in different styles. Using the geometric features reference library 320, the described avatar generation systems can translate parameterized avatars from one style to a different style. Consider now an example use scenario in accordance with one or more implementations.

Figure 4:
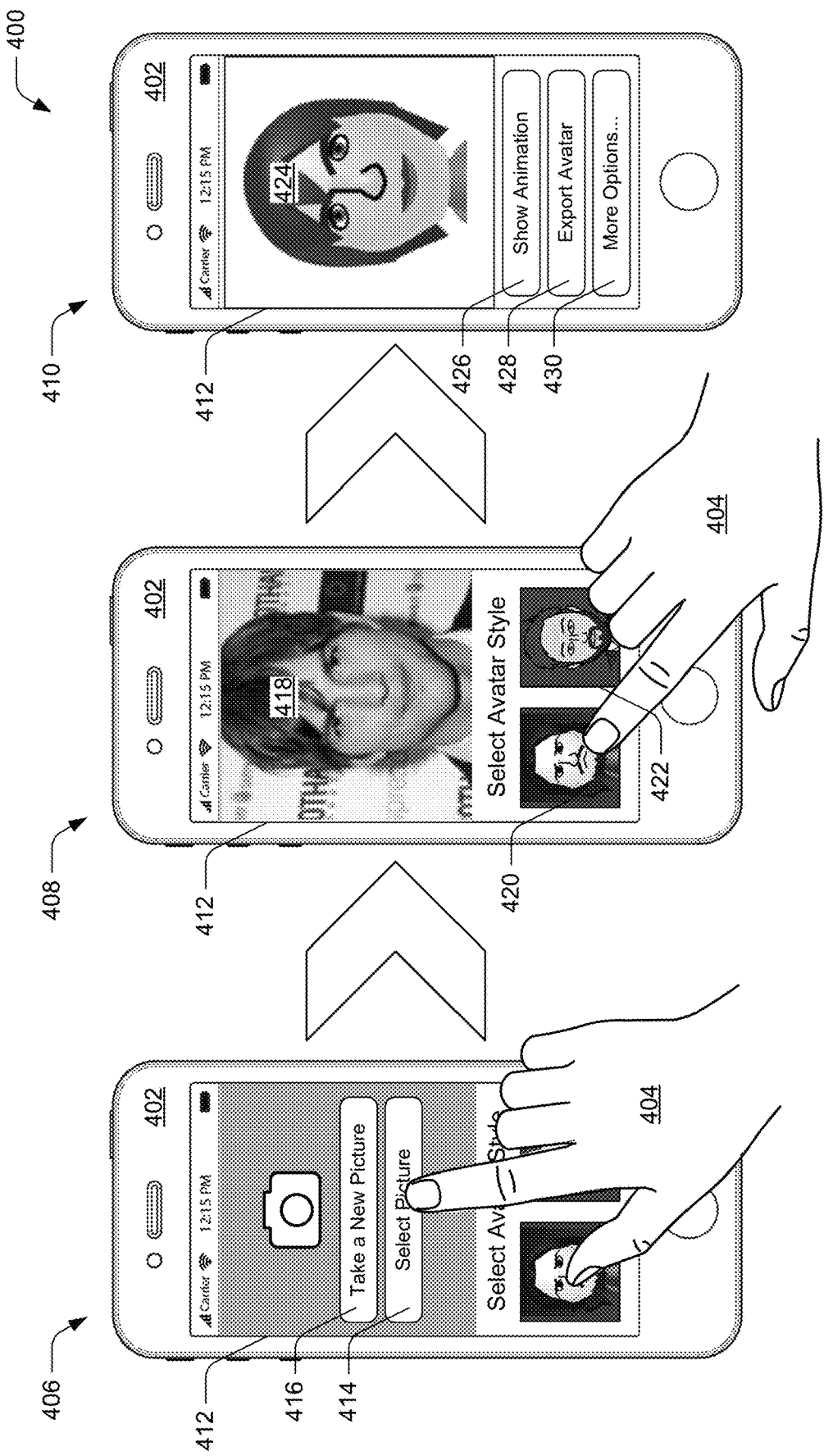
FIG. 4 depicts a scenario in which a parameterized avatar is generated based on a digital photograph of a person and a selected avatar style.

FIG. 4 depicts a scenario 400 in an example implementation in which a parameterized avatar is generated based on a digital photograph of a person and a selected avatar style.

The example scenario 400 includes mobile device 402 and a hand of a user 404. The example scenario 400 further depicts the mobile device 402 in three different stages—a first stage 406, second stage 408, and third stage 410. In each of the first, second, and third stages 406, 408, 410, the mobile device 402 is depicted displaying a user interface 412 that facilitates generation of parameterized avatars. By way of example, the user interface 412 includes different instrumentalities presented at the different depicted stages that prompt the user 404 to provide input for generating a parameterized avatar. Further, selections made by the user 404 are received as some form of user input (e.g., touch, voice, stylus, etc.) in relation to the user interface 412 (and the presented instrumentalities of the different stages).

In the context of the first stage 406, the user interface 412 is configured with instrumentalities that enable the user 404 to select whether to use already-captured digital photorealistic content (e.g., image or video) or to capture new digital photorealistic content for generation of a parameterized avatar. Use of already-captured digital photorealistic content may involve accessing this content from storage local to the mobile device 402 and/or storage remote from the mobile device 402, e.g., digital photorealistic content maintained with a data storage service, by a social networking service, and so forth. In contrast, use of new digital photorealistic content involves capturing this content using imaging functionality (e.g., a camera) associated with the mobile device 402, e.g., a camera incorporated as part of the mobile device, a camera communicably coupled with the mobile device, and so forth.

In the first stage 406, the user 404 is depicted providing touch input in relation to a select-picture instrumentality 414, which may correspond to the scenario in which already-captured digital photorealistic content is selected for generating a parameterized avatar. The user interface 412 is also shown at the first stage 406 including a take-new-picture instrumentality 416, which may correspond to the scenario in which new digital photorealistic content is captured to generate a parameterized avatar. User interfaces may be configured in different ways than depicted and described herein to enable selection of already-captured digital photorealistic content and/or capture of new digital photorealistic content for generating parameterized avatars.

In the second stage 408, the user interface 412 is depicted presenting selected digital image 418. In general, the selected digital image 418 serves as a basis for generating a parameterized avatar. The mobile device 402 provides this selected digital image 418 as input to the trained machine-learning model 108. In the context of FIG. 2, the selected digital image 418 is an example of the face digital image 206. Additionally, the user interface 412 is depicted presenting style selection instrumentalities 420, 422. In the example scenario 400, the style selection instrumentalities 420, 422 are depicted as style representations, which include example avatar faces indicative of a respective style. Style selection instrumentalities may indicate a respective style in other ways without departing from the spirit or scope of the techniques described herein.

In the illustrated example 400, the user 404 is shown selecting the style selection instrumentality 420. User input to select the style selection instrumentality 420 is effective to select a first style for generating a parameterized avatar. In contrast, user input to select the other style selection instrumentality 422 is effective to select a second, different style for generating a parameterized avatar. In the context of FIG. 2, a selection received in relation to either of the style selection instrumentalities 420, 422 corresponds to an example of the style selection input 208. Moreover, the style selection instrumentality 420 may correspond to a visual example of the style in which the first style machine-learning model 202 generates parameterized avatars. Similarly, the other style selection instrumentality 422 may correspond to a visual example of the different style in which the second style machine-learning model 204 generates parameterized avatars.

Based on receiving the selections of the selected digital image 418 and the style instrumentality 420, the mobile device 402 generates a parameterized avatar from the selected digital image 418. In the third stage 410, the user interface 412 is depicted presenting representative avatar image 424. The representative avatar image 424 is one example rendering of the parameterized avatar generated based on the selected digital image 418 and according to the style represented by the style selection instrumentality 420.

Due to the parameterization, the generated avatar can be positioned in different ways (e.g., stances) and viewed from different angles (e.g., from a side, from a back, from a relatively close viewpoint, from a relatively far viewpoint, viewpoints in between the relatively close and far view point, and so on). This parameterization also enables the facial features (e.g., lips, eye lids, eyes, eyebrows) determined by the machine-learning model for the generated avatar to be adjusted to convey different expressions, e.g., anger, happiness, sadness, and so forth. In addition to this, the parameterization also enables the generated avatar to be animated, such as to walk, appear to be talking, interact with objects or other avatars, jump, or perform a variety of other movements. Accordingly, various digital content (e.g., images, videos, augmented and virtual reality (AR/VR) content) can be generated that includes one or more representations of the avatar.

In the third stage 410, the user interface 412 is also depicted with a show-animation instrumentality 426, an export-avatar instrumentality 428, and a more-options instrumentality 430. Although depicted with these instrumentalities the user interface 412 may include different instrumentalities for carrying out various operations in relation to parameterized avatars generated in accordance with the described techniques. Broadly speaking, the show-animation instrumentality 426 represents functionality of the mobile device 402 to receive user input via the user interface 412 requesting avatar animation, and, responsive to a received animation request, animate the parameterized avatar and output digital content (e.g., a digital video, .gif, and so on) showing the animation of the avatar.

The export-avatar instrumentality 428 represents functionality of the mobile device 402 to receive user input via the user interface 412 requesting avatar export, and, responsive to a received export request, export data corresponding to the parameterized avatar or digital content (e.g., images, videos, and so on) generated from the parameterized avatar. By way of the example, an export request may request to export the parameterized avatar to a content creation application (e.g., Adobe Creative Cloud® applications), to save the parameterized avatar to storage (e.g., local to the mobile device 402 or at a remote storage location), or to send the parameterized avatar via data transmission channels, such as email, text, Bluetooth, and so on. Alternately or in addition, the export request may request to export the digital content generated using the parameterized avatar, such as to a content creation application, a social networking service, a different type of web service (e.g., fantasy sports service, email service, a video-sharing service), and so on. An export request may request to export a parameterized avatar, or digital content generated therefrom, to different destinations without departing from the spirit or scope of the techniques described herein.

The more-options instrumentality 430 represents functionality of the mobile device 402 to receive user input via the user interface 412 requesting various other operations be performed in relation to a generated parameterized avatar. By way of example, the various other operations may include presenting one or more user interfaces that enable users to change features determined by the trained machine-learning model 108. For instance, these user interfaces may enable the user 404 to select a different nose or different eyes than determined by the trained machine-learning model 108, change colors of features, and/or to move features to different positions than determined by the trained machine-learning model 108, e.g., move eyes further apart or closer together.

In one or more implementations, user interfaces that enable the user 404 to change the parameterized avatar's features may present k-number of different versions of a feature, which the user 404 can select from to change the feature. When user input is received to change a nose, for example, the user interfaces may present k noses from which the user 404 can select. The presented k versions may be a top-k cartoon versions of the feature. These cartoon versions are determined by the trained machine-learning model 108 for the corresponding photorealistic feature in the selected digital image 418. In one or more implementations, these user interfaces include an "exploded view" user interface, via which features (e.g., eyes, mouth, nose, hair, facial structure, body type, and so on) are individually selectable. When a feature is selected, the exploded view may enable the selected feature to be swapped with a different version of the feature or the feature adjusted (e.g., change hair or eye color). The exploded view may also enable different "layers" of an avatar to be presented for manipulation in a focused on manner, e.g., a face may be shown without hair or features may be presented skin-colored, eyes may be shown without a rest of the face or zoomed in, and so forth. The more-options instrumentality 430 may represent a variety of operations that are performable in relation to a parameterized avatar without departing from the spirit or scope of the techniques described herein.

It is to be appreciated that although FIG. 4 is depicted utilizing touch input to leverage the described functionality, other types of inputs may also or alternatively be used to leverage the described functionality, including stylus input, keyboard and/or mouse input, voice commands, gaze-based input, gesture input, and so forth.

Having discussed example details of the techniques for generation of parameterized avatars, consider now some example procedures to illustrate additional aspects of the techniques.

Example Procedures

This section describes example procedures of generation of parameterized avatars in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the avatar generation manager system 106 of FIG. 1 or the client device 104 that makes use of the machine learning module 118.

Figure 5:
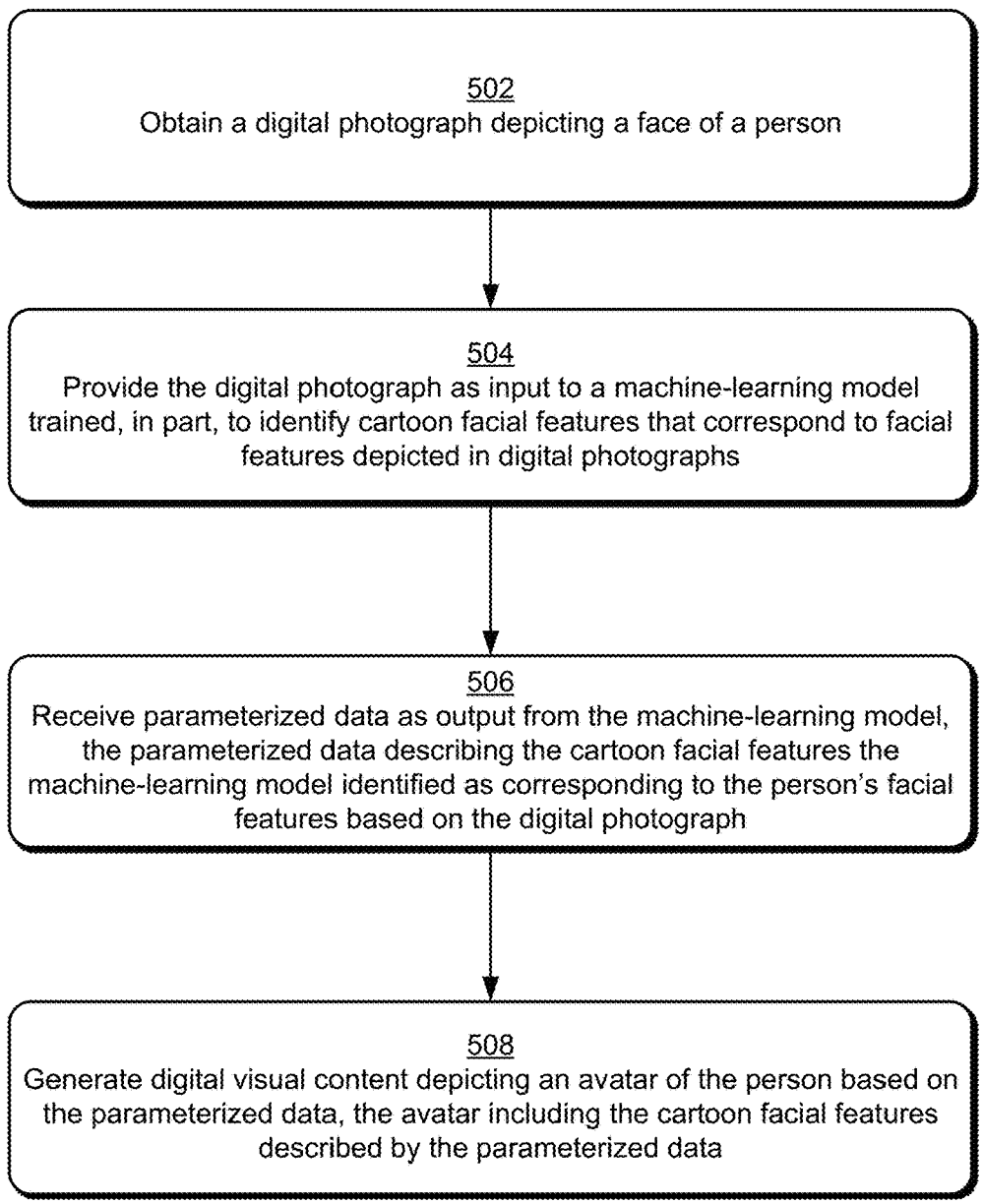
FIG. 5 depicts a procedure in an example implementation in which parameterized data indicative of an avatar is generated based on a digital photograph depicting a face of a person.

FIG. 5 depicts an example procedure 500 in which parameterized data indicative of an avatar is generated based on a digital photograph depicting a face of a person.

A digital photograph depicting a face of a person is obtained (block 502). By way of example, the machine learning module 118 obtains the face digital image 206, which corresponds to a digital photograph depicting a face of a person. The digital photograph is provided as input to a machine-learning model that has been trained using a combined supervised and unsupervised training approach, in part, to identify cartoon facial features that correspond to facial features depicted in digital photographs (block 504). By way of example, the machine learning module 118 provides the face digital image 206 as input to the trained machine-learning model 108. As discussed in more detail above, the trained machine-learning model 108 is trained using supervised and unsupervised training. Further, the trained machine learn model 108 is trained, at least in part, to identify cartoon facial features (e.g., that are part of one or more facial feature libraries) that correspond to facial features depicted in digital photographs.

Parameterized data is received as output from the machine-learning model (block 506). In accordance with the principles discussed herein, the parameterized data describes the cartoon features the machine-learning model identified as corresponding to the person's facial features based on the digital photograph. By way of example, the parameterized avatar 212 is received as output of the trained machine-learning model 108.

Digital visual content depicting an avatar of the person is generated based on the parameterized data (block 508). In accordance with the principles discussed herein, the avatar includes the cartoon facial features described by the parameterized data. By way of example, the application 116 generates digital visual content (e.g., an image or animation) that depicts a cartoon avatar of the person depicted in the face digital image 206. In particular, the application 116 generates this digital visual content based on the parameterized avatar 212.

Figure 6:
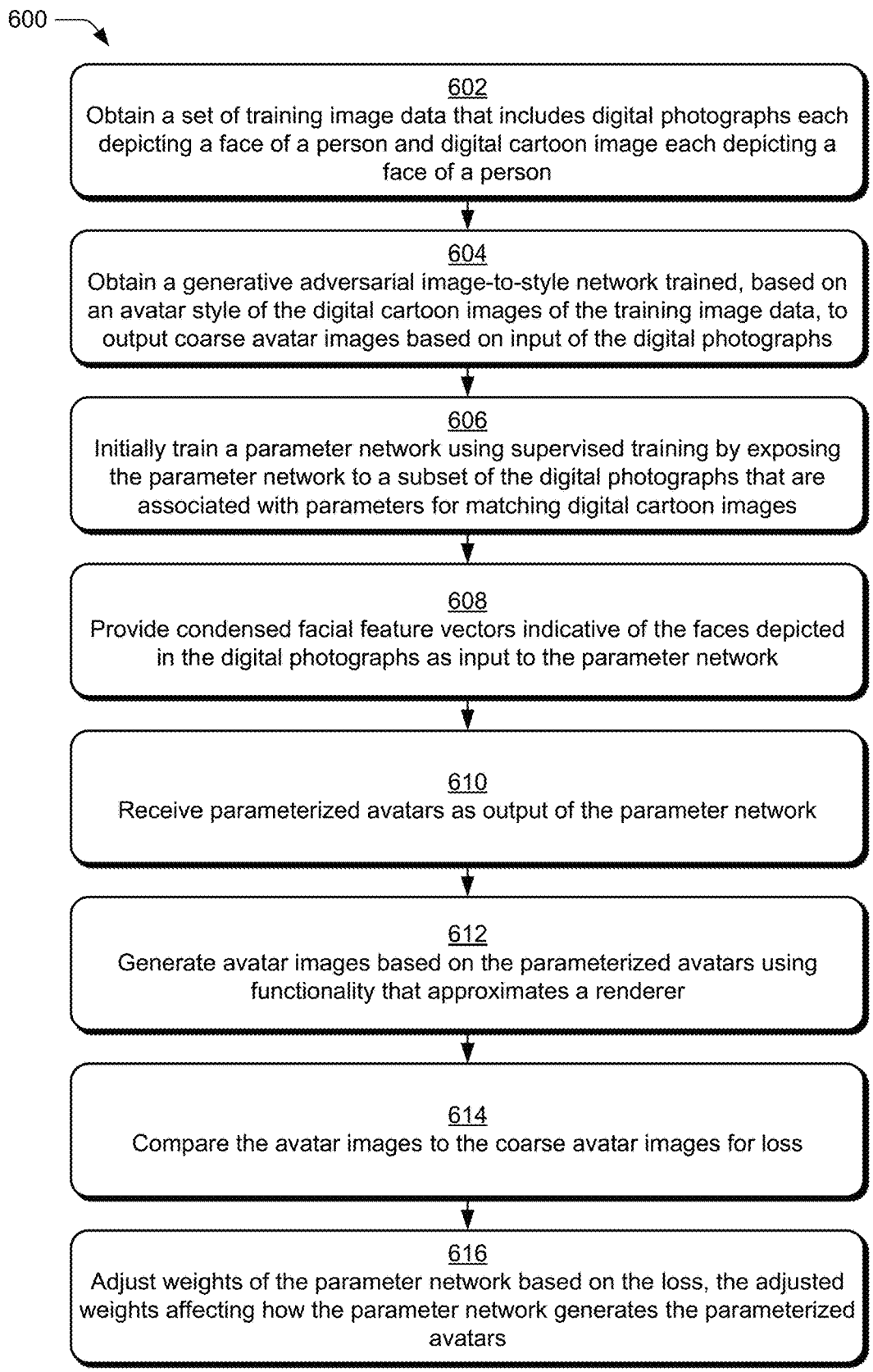
FIG. 6 depicts a procedure in an example implementation in which a machine-learning model is trained to generate avatars with a particular style from digital photographs of persons.

FIG. 6 depicts an example procedure 600 in which a machine-learning model is trained to generate avatars with a particular style from digital photographs of persons.

A set of training image data is obtained (block 602). In accordance with the principles discussed herein, the set of training image data includes a smaller subset of the training data designated for supervised training and a larger subset of the training data designated for unsupervised training. The smaller subset of training data includes digital photographs that each depict a face of a person and also includes, for each digital photograph, a corresponding digital cartoon image of the person having parameters selected to generate the corresponding digital cartoon image. These parameters are embedded in a substantially same structure of data as parameterized avatars output by a final trained machine-learning model. In contrast to the smaller subset, the larger subset of the training data includes unpaired digital photographs and digital cartoon images. In the context of the previously discussed figures, the avatar generation framework 120 obtains the training image data 122.

A generative adversarial image-to-style network is obtained (block 604). In accordance with the principles discussed herein, the image-to-style network is trained, based on an avatar style of the digital cartoon images, to output coarse avatar images based on receiving the digital photographs as input. By way of example, the avatar generation framework 120 obtains the image-to-style network 304, which is trained based on an avatar cartoon style of the digital cartoon images in the training image data 122. As discussed in more detail above, the image-to-style network 304 is configured as a GAN to output the coarse avatar image 312 based on input of a digital photograph from the training image data 122.

A parameter network is initially trained using the smaller subset of the training data and according to a supervised training approach (block 606). By way of example, the avatar generation framework 120 exposes the parameter network 302 to the digital photographs of the smaller subset of the training data 122 and the parameters of the digital cartoon images that match those digital photographs. After the initial, supervised training, the parameter network is subsequently trained using the larger subset of the training data and an unsupervised training approach. By way of example, the avatar generation framework 120 exposes the parameter network to the digital photographs of the larger subset of the training data 122. In one more implementations, the avatar generation framework 120 carries out the supervised training of the parameter network 302 in accordance with the following discussion.

Condensed facial feature vectors, indicative of the faces depicted in the digital photographs, are provided as input to the parameter network (block 608). By way of example, the avatar generation framework 120 generates condensed facial feature vectors that are indicative of the facial features detected in each digital photograph in the larger subset of the training image data 122. These condensed facial feature vectors are provided as input to the parameter network 302, which may be configured as a neural network.

Parameterized avatars are received as output of the parameter network (block 610). By way of example, the avatar generation framework 120 receives the parameterized avatar 310 based on input of a digital photograph from the training image data 122. Avatar images are generated based on the parameterized avatars and using functionality that approximates a renderer (block 612). By way of example, the avatar generation framework 120 provides the parameterized avatars 310 as input to the rendering module 306, which approximates a renderer. The rendering module generates the avatar images 314 from the parameterized avatars 310.

The avatar images are compared to the coarse avatar images for loss (block 614). By way of example, the image comparison module 308 compares each of the coarse avatar images 312 generated by the image-to-style network 304 to a corresponding avatar image 314 generated based on a respective parameterized avatar 310. The image comparison module 308 compares these images for loss, such as differentiable loss.

Weights of the parameter network are adjusted based on the loss (block 616). In accordance with the principles discussed herein, the adjusted weights affect how the parameter network generates the parameterized avatars to preserve identities and expressions of the faces depicted in digital photographs. By way of example, the avatar generation framework 120 adjusts weights associated with hidden layers or latent features of the parameter network 302 based on the loss determined according to the comparison at block 614.

Figure 7:
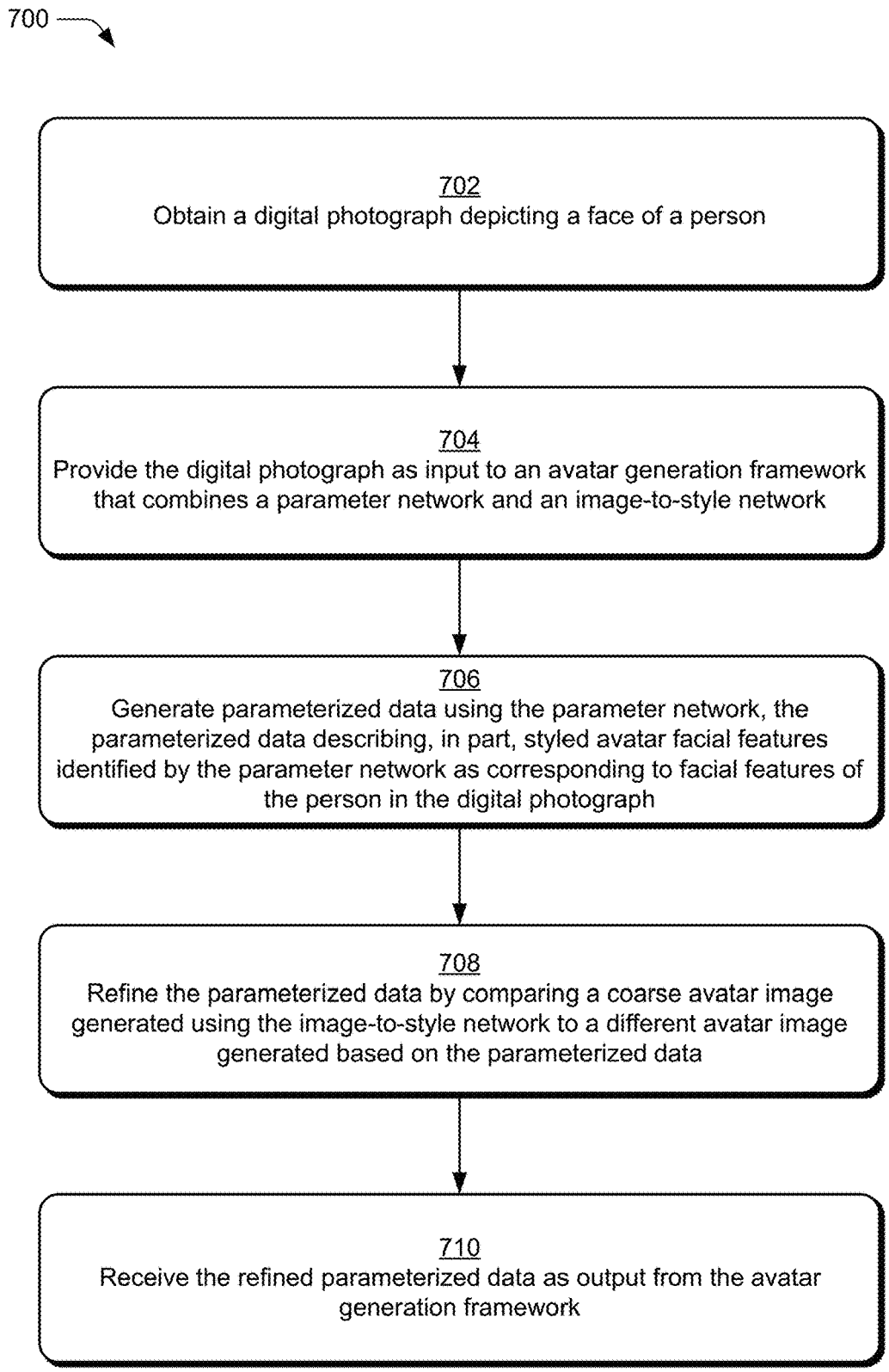
FIG. 7 depicts an additional procedure in an example implementation in which parameterized data indicative of an avatar is generated based on a digital photograph depicting a face of a person.

FIG. 7 depicts an additional example procedure 700 in which parameterized data indicative of an avatar is generated based on a digital photograph depicting a face of a person.

A digital photograph depicting a face of a person is obtained (block 702). By way of example, the application 116 obtains the selected digital image 418, which corresponds to a digital photograph depicting a face of a person. The digital photograph is provided as input to an avatar generation framework that combines a parameter network and an image-to-style network (block 704). By way of example, the application 116 includes a machine-learning model that is configured in accordance with the avatar generation framework 120, which includes the parameter network 302 and the image-to-style network 304, e.g., CycleGAN. In this example, the application 116 thus provides the selected digital image 418 as input to the avatar generation framework 120.

Parameterized data is generated using the parameter network of the avatar generation framework (block 706). In accordance with the principles described herein, the parameterized data describes, in part, styled avatar features identified by the parameter network as corresponding to facial features of the person depicted in the digital photograph. By way of example, the parameter network 302 generates parameterized avatar 310. In this example, the parameterized avatar 310 describes styled avatar features identified by the parameter network 302 as corresponding to facial features of the person depicted in the selected digital image 418.

The parameterized data is refined based on comparison with a coarse avatar image generated using the image-to-style network of the framework (block 708). In accordance with the principles discussed herein, the coarse avatar image is compared to a different avatar image generated based on the parameterized data. By way of example, the image-to-style network 304 generates the coarse avatar image 312 based on the selected digital image 418, and the rendering module 306 generates the avatar image 314 based on the parameterized data generated at block 706. The image comparison module 308 then refines this parameterized data generated based on a comparison of these avatar images. The steps of blocks 706 and 708 may be performed iteratively until a convergence is reached, e.g., according to a similarity of the coarse avatar image and the different avatar image.

The refined parameterized data is received as output from the avatar generation framework (block 710). By way of example, the application 116 receives the parameterized data, as refined at block 708, from the avatar generation framework 120 as output, e.g., after a determination that the parameterized data is suitably refined based on comparison of the coarse avatar image and the different avatar image.

Having described example procedures in accordance with one or more implementations, consider now an example system and device that can be utilized to implement the various techniques described herein.

Example System and Device

Figure 8:
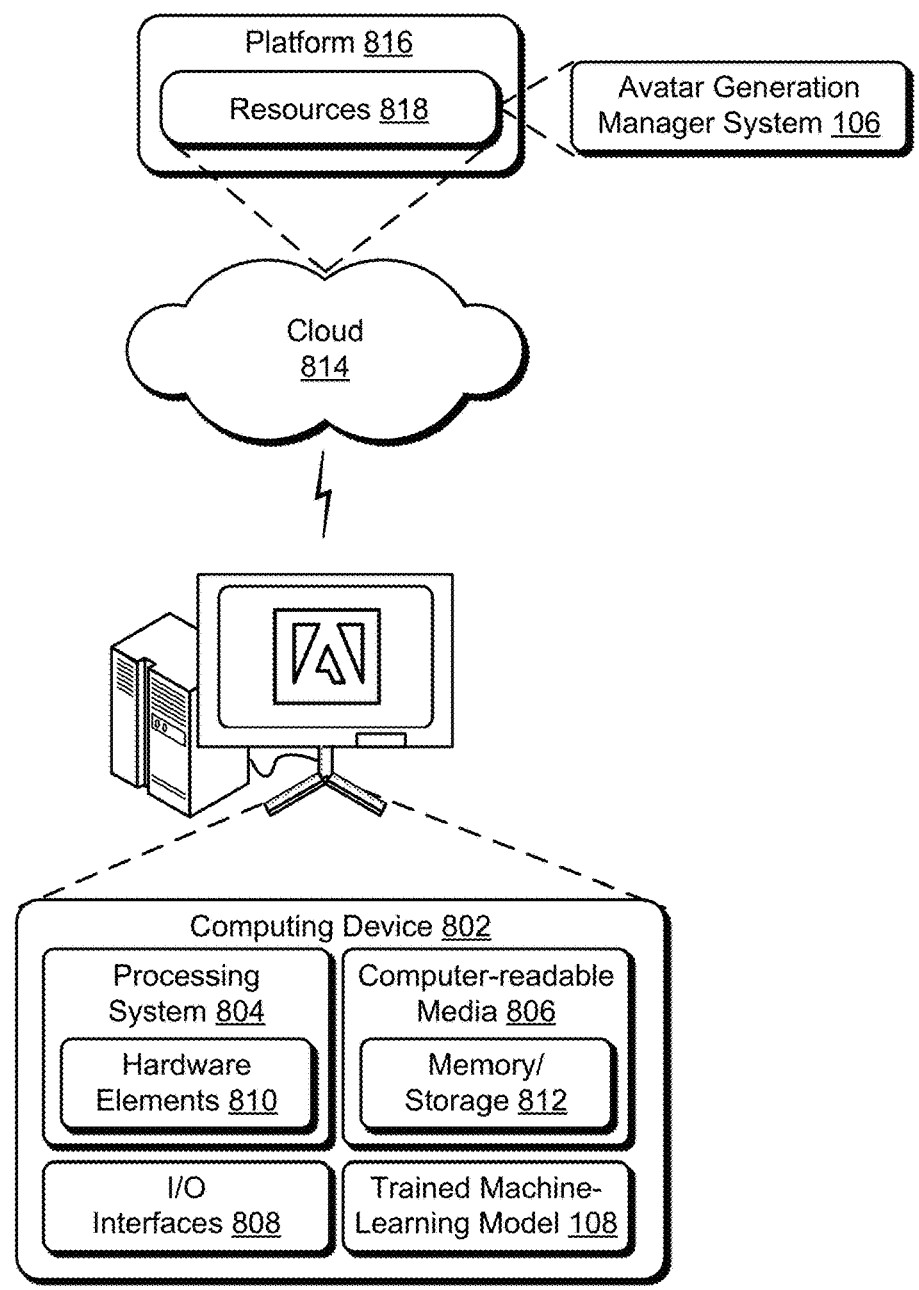
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the trained machine-learning model 108 and the avatar generation manager system 106. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to provide an avatar for use in digital visual content that preserves an identity of a person depicted in digital photographic content serving as a basis for the avatar, a method implemented by at least one computing device, the method comprising:
   receiving, by the at least one computing device, a digital photograph depicting a face of a person;
   providing, by the at least one computing device, the digital photograph as input to an avatar generation framework that combines a parameter network and an image-to-style network;
   generating, by the at least one computing device, parameterized data using the parameter network, the parameterized data describing, in part, styled avatar facial features identified by the parameter network as corresponding to facial features of the person depicted in the digital photograph;
   refining, by the at least one computing device, the parameterized data by comparing a coarse avatar image generated using the image-to-style network to a different avatar image generated based on the parameterized data; and
   receiving, by the at least one computing device, the parameterized data as output from the avatar generation framework.

2. A method as described in claim 1, further comprising generating digital visual content depicting an avatar of the person based on the parameterized data, the avatar including the styled avatar facial features described by the parameterized data.

3. A method as described in claim 2, wherein the digital visual content is an image depicting the avatar.

4. A method as described in claim 2, wherein the digital visual content is a video having an animation of the avatar.

5. A method as described in claim 2, wherein the digital visual content is augmented reality and/or virtual reality (AR/VR) content having a rendering of the avatar.

6. A method as described in claim 1, wherein the parameterized data is a feature vector indicative, in part, of the styled avatar facial features.

7. A method as described in claim 1, wherein:
   the parameter network is trained to identify the styled avatar facial features from a library of the styled avatar facial features based on the refining; and
   the styled avatar facial features included in the library have a same cartoon style.

8. A method as described in claim 1, further comprising:
   presenting, via a user interface, two or more avatar style options, the two or more avatar style options each indicating a different avatar style of the styled avatar facial features and each corresponding to a different combination of parameter network and image-to-style network trained according to a respective avatar style;
   receiving a selection of one of the avatar style options; and
   providing the digital photograph as input to a corresponding avatar generation framework for the selected avatar style option.

9. A method as described in claim 8, further comprising receiving the parameterized data as output from the corresponding avatar generation framework, the parameterized data describing the styled avatar facial features of the respective avatar style that the corresponding avatar generation framework identified and refined.

10. A method as described in claim 1, further comprising presenting, via a user interface, an instrumentality selectable to change a styled avatar facial feature described by the parameterized data.

11. A method as described in claim 10, further comprising:
   responsive to receiving selection of the instrumentality, presenting a top-k different versions of the styled avatar facial feature, the top-k different versions of the styled avatar facial feature identified by the parameter network as suitably corresponding to the person's respective facial feature as depicted in the digital photograph; and
   responsive to receiving a selection of one of the different versions of the styled avatar facial feature, updating the parameterized data to indicate a change of the styled avatar facial feature to the selected different version of the styled avatar facial feature.

12. A method as described in claim 1, wherein:
the parameter network is further configured to identify styled avatar features of other body parts that correspond to depicted body parts in digital photographs; and
the parameterized data further describes the styled avatar features of the other body parts identified by the parameter network as corresponding to the person's other body parts depicted in the digital photograph.

13. A system comprising:
an avatar generation framework implemented at least partially in hardware of at least one computing device and trained to identify styled avatar facial features that correspond to facial features of persons depicted in digital photographs, the avatar generation framework trained based, in part, on a set of training data including digital photographs of persons unpaired with digital styled images of persons in the training data; and
an avatar generation module implemented at least partially in the hardware of the at least one computing device to:
provide a digital photograph depicting a face of a person as input to the avatar generation framework;
generate parameterized data based on the digital photograph using a parameter network of the avatar generation framework, the parameterized data describing the styled avatar facial features the parameter network identified as corresponding to the person's facial features depicted in the digital photograph;
refine the parameterized data based on a coarse avatar image generated using an image-to-style network of the avatar generation framework; and
receive refined parameterized data as output from the avatar generation framework.

14. A system as described in claim 13, further comprising a digital visual content generation module to generate digital visual content depicting an avatar of the person based on the refined parameterized data.

15. A system as described in claim 13, further comprising an additional avatar generation framework, the avatar generation framework configured to generate the parameterized data according to a first avatar style and the additional avatar generation framework configured to generate the parameterized data according to a second avatar style.

16. A system as described in claim 15, further comprising a model selection module to cause the digital photograph to be provided as input to the avatar generation framework or the additional avatar generation framework based on receipt of a user selection of the first or second avatar styles.

17. In a digital medium environment to train an avatar generation framework to provide an avatar for use in digital visual content that preserves an identity of a person depicted in digital photographic content, a method implemented by at least one computing device, the method comprising:
receiving, by the at least one computing device, a first and second set of training image data, the first set of training image data including digital photographs each depicting a face of a person and training parameterized data describing a corresponding digital styled image of the person, the second set of training image data including unpaired digital photographs and digital styled images depicting faces of persons, and the digital styled images having a particular avatar style;
initially training, by the at least one computing device, a parameter network of the framework to generate parameterized data describing styled avatar facial features of the particular avatar style identified for the unpaired digital photographs based on the first set of training image data;
generating, by the at least one computing device, parameterized-avatar images based on the parameterized data;
generating, by the at least one computing device, coarse avatar images based on the unpaired digital photographs using an image-to-style network of the framework;
comparing, by the at least one computing device, the parameterized-avatar images to the coarse avatar images; and
adjusting, by the at least one computing device, the parameter network based on the comparing, the adjusting affecting how the parameter network identifies the styled avatar facial features of the particular avatar style to preserve identities and expressions of the faces depicted in the digital photographs.

18. A method as described in claim 17, wherein the image-to-style network is a Cycle generative adversarial network (CycleGAN) pre-trained with the training image data.

19. A method as described in claim 17, wherein the comparing includes determining loss between the parameterized-avatar images and the coarse avatar images, and the adjusting adjusts weights of the parameter network based on the loss.

20. A method as described in claim 17, wherein the parameter network is packaged for use with one or more applications to generate parameterized avatars having the particular avatar style.

* * * * *